2 Sheets—Sheet 2.

J. O. BROWN.
HAND-BINDER.

No. 190,701. Patented May 15, 1877.

WITNESSES
Alex Mahon
John G. Center

INVENTOR
James O. Brown
by A. M. Smith
Attorney

UNITED STATES PATENT OFFICE.

JAMES O. BROWN, OF MASSILLON, OHIO, ASSIGNOR OF A PART OF HIS RIGHT TO EDWIN BAYLISS, PLINY F. HODGES, AND FRANÇOIS T. LOMONT, OF SAME PLACE; SAID HODGES ASSIGNOR TO SAID BAYLISS.

IMPROVEMENT IN HAND-BINDERS.

Specification forming part of Letters Patent No. 190,701, dated May 15, 1877; application filed August 9, 1875.

*To all whom it may concern:*

Be it known that I, JAMES O. BROWN, of Massillon, in the county of Stark and State of Ohio, have invented certain new and useful Improvements in Harvesters, of which the following is a full, clear, and exact description, reference being had to the accompanying drawing, making part of this specification, in which—

Figure 1:
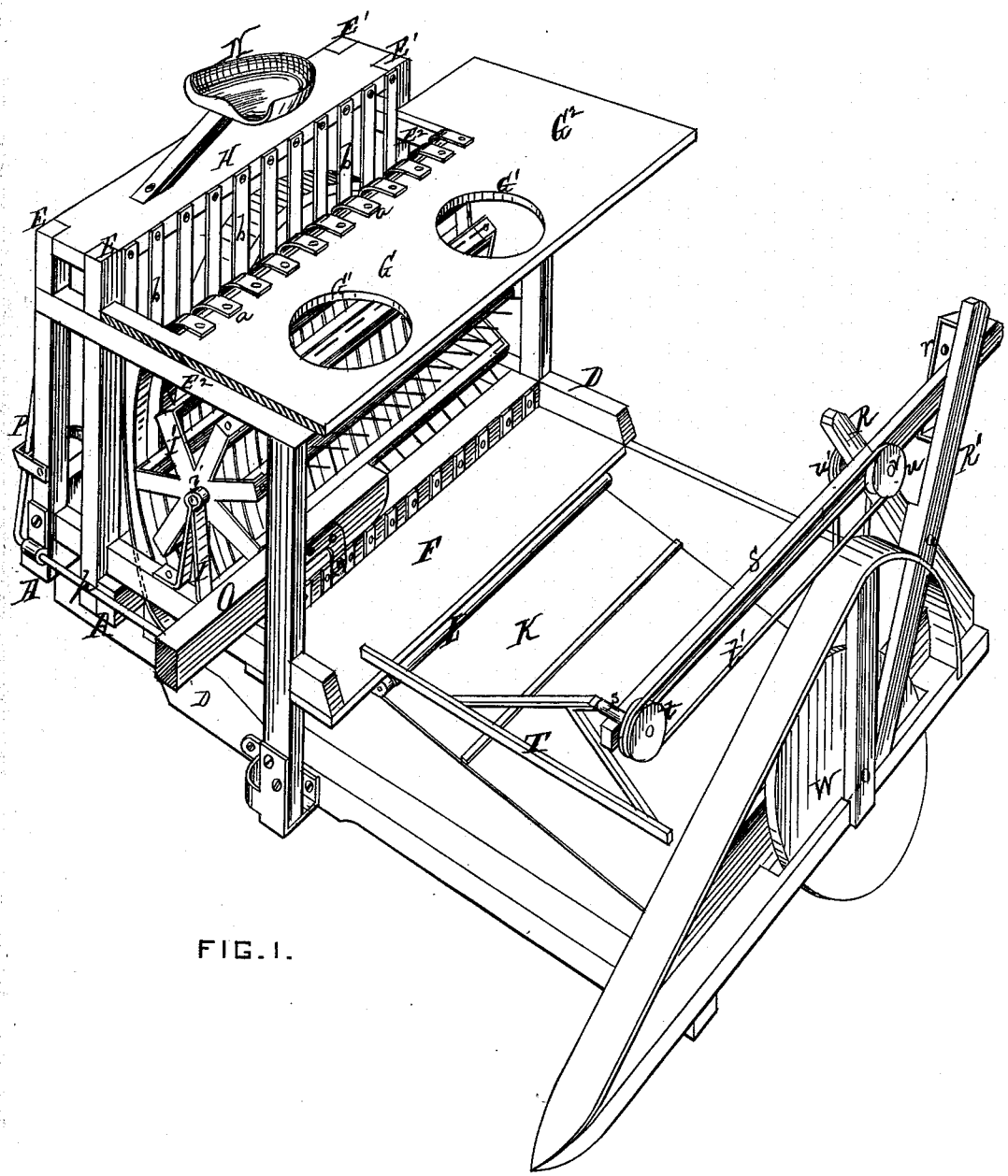
Figure 2:
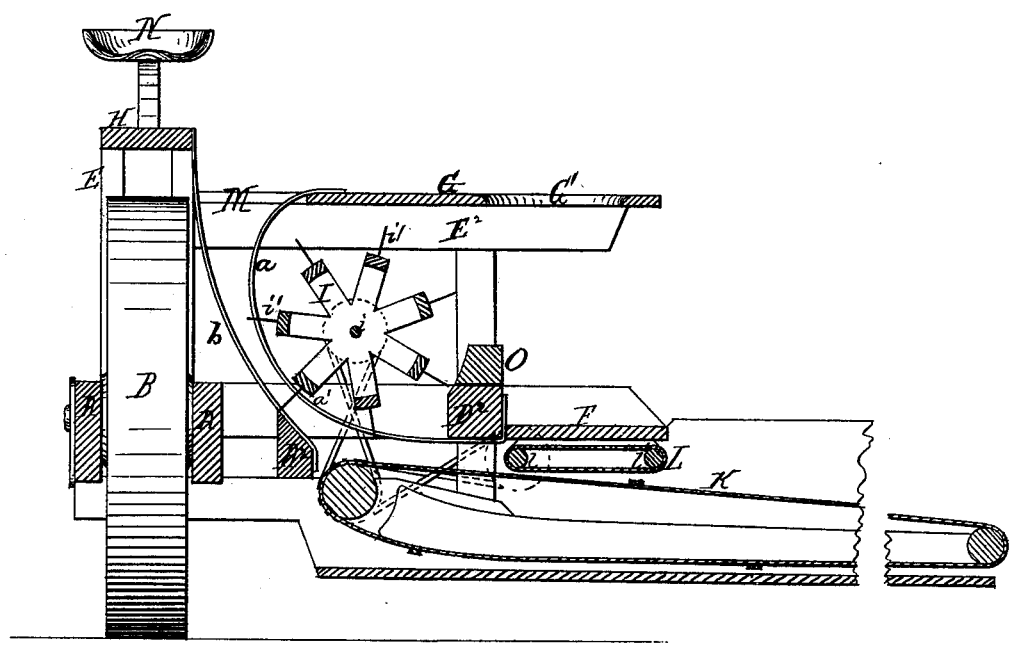

Figure 1 is a perspective view, taken from the front grain-side corner, of so much of a harvester as is necessary to show my improvements, and Fig. 2 is a vertical transverse section through the same, the driving-wheel being shown in front elevation.

Similar letters of reference denote corresponding parts in both figures.

The invention relates to that class of harvesters in which the grain is conveyed from the platform upon which it falls to an elevated receptacle, from which it is removed and bound by men riding on the machine; and it consists, first, in a novel arrangement of the binders' support and tables and driver's-seat relative to the main drive-wheel, and elevator for preventing the overturning of the machine on side-hill or uneven ground; second, in a novel arrangement of supplemental apron, in combination with the platform apron or carrier, for feeding the grain to the elevator; and, third, in a novel arrangement of reel-supporting and driving devices relative to and for getting them out of the way of the binders' support and tables located at the grain side of the drive-wheel and elevator.

In the accompanying drawings, A $A^1$ represent a rectangular main frame, between the two outer longitudinal sills of which the drive-wheel B is mounted in any suitable manner, permitting the convenient adjustment of the height of the frame relatively to the wheel.

To the inner ends of the transverse sills A the adjacent ends of the transverse sills C of the platform-frame are bolted, said frame being constructed in any usual or preferred way.

The longitudinal timbers A are notched or recessed at their ends on their upper faces, and have transverse bars D $D^1$ secured to them in front and rear, and to these and to the frame-timbers uprights E $E^1$ are secured, to which, at or near their upper ends, transverse bars $E^2$ are secured, forming an upright elevator-frame around the drive-wheel and elevator, and forming a support for the latter and for the binders' stands and tables.

The bars D $D^1$ at their inner ends overhang the platform-frame, as shown in Fig. 2, and are united near their inner or platform ends by a longitudinal bar, $D^2$, the inner projecting ends of said bars D $D^1$ forming a support for the binders' stand F, connected therewith and overhanging the inner end of the platform-apron.

The upper transverse bars $E^2$ overhanging the bars D $D^1$, form a support for the binders' table G, which is arranged over the stand or platform F, and is perforated at $G'$ $G'$ to receive the legs of the binders standing on the platform F, or sitting on the table G, and the upper ends of the uprights E, which project above the bars $E^2$, form a point of attachment for and support to the longitudinal seat-plank H arranged directly over the drive-wheel B, said plank affording also a support for the upper ends of one series of elevator-slats, as hereinafter explained.

The transverse bars D $D^1$, midway between the drive-wheel and the longitudinal bar $D^2$, have standards I secured to them in suitable bearings, in which the shaft $i$ of a longitudinal drum or cylinder, $I'$, is mounted, said drum being made either a complete cylinder or composed of end spiders, the arms of which are united by longitudinal bars, as shown, the latter form being preferred, for the reason that the requisite strength may be obtained with less weight of material.

These longitudinal bars are armed each with a row of teeth, $i'$, set at regular distances apart, equal to the width of the elevator-slats, and in the rotation of the cylinder these teeth project between said slats for picking up and elevating the grain.

The cylinder $I'$ is arranged underneath the binders' table G, and to the outer or stubble side edge of the latter the upper ends of a series of curved slats, $a$, are secured, said slats curving outward and downward outside of the cylinder, and, extending thence underneath the cylinder, have their lower ends secured to the longitudinal bar D².

These slats $a$, at a point, $a'$, on their concave inner faces, are in close proximity with the surface of the cylinder I', and the teeth $i'$ consequently project between said slats nearly their entire length; but from this point $a'$ the slats $a$ diverge from the cylinder in both directions, adapting the teeth to enter and to be withdrawn gradually, for picking up the grain, and for cleaning the teeth after the grain has been elevated.

Outside of the slats $a$ is a second series of slats, $b$, of the same width, and spaced the same as slats $a$, the upper ends of these slats $b$ being secured to the seat-plank H, and the lower ends to a frame-sill, A², in close proximity with the inner platform apron roller, as shown in Fig. 2.

The slats $a$ and $b$ diverge at their upper ends, forming an open-bottom hopper or grain-receptacle, M, into which the grain is elevated between said slats, and from which it is prevented from escaping by the elevating-teeth $i'$.

The platform-apron K, at its inner end, extends underneath the cylinder I and lower ends of the slats $a$, and into close proximity with the lower ends of the outer slats $b$, and said apron or carrier, which may be of any usual or preferred construction, serves to carry the grain inward against the slats $b$, where it is picked up and elevated by the teeth $i'$.

Above the platform-apron K, and underneath the binders' stand F, in suitable bearing-brackets connected with said stand or the frame-bars D D¹, two longitudinal rollers, $l\ l'$, are mounted in the same, or substantially the same, horizontal plane, said rollers carrying a short endless apron, L, to which motion is imparted, in a direction the reverse of that given to the platform-apron, by means of a pulley on the rear end of roller $l$, and a cross-belt from a pulley on the rear end of the inner platform-apron roller, or by any other convenient arrangement of belts and pulleys or gears.

This apron extends from the outer edge of the binders' platform F inward to or beyond the lower ends of slats $a$, and by the arrangement and operation described serves not only to prevent said stand or platform from obstructing the passage of the grain underneath the same to the elevator, but it also serves, in connection with the platform-apron, to give a positive movement to the grain underneath the binders' platform to the elevator.

The binders' table G may be extended at its ends, as shown at G², in front and in rear of the receptacle M, if desired, but ordinarily the width of the table between said receptacle and the openings for the binders, or the space between the binders, or at one side thereof, will be sufficient to enable the binders to readily bind the grain, which may then be deposited in any usual bundle-carrier or upon the ground, outside of or behind the machine.

The driver's seat N is located over the seat-plank H, upon any suitable support or standard mounted thereon.

By the construction and arrangement of parts, as shown and described, it will be seen that the weight of the binders is brought upon the platform side of the elevator and drive-wheel, while the driver is located directly over said wheel, and a little to the right of the team, in the most convenient position for controlling the same.

The machine is thus brought into the most compact shape, and all danger of overturning the same on side-hill or uneven ground, by the weight of the binders, is effectually obviated.

The tongue O is pivoted to the longitudinal bar D², or some other convenient point on the grain side of the elevator for throwing the weight and drag of the elevator and drive-wheel outside of the line of draft, and thereby counterbalancing the drag of the cutting apparatus and grain-platform, thus equalizing the draft, or obviating side draft.

The tongue in front of the main frame has a link pivoted to it at one end, the other end of said link being connected with a crank-arm on a rock-shaft, $p$, from which a lever, P, extends up within convenient reach of the driver, enabling him to rock the machine on its carrying-wheels for varying the height of cut for passing obstructions, or for removal from one place to another.

The platform-frame at its rear grain-side corner has two posts, R R', secured rigidly to it, said posts being set to cross each other obliquely, as shown, in the form of the letter X, forming a strong bracing-standard, and the upright R has pivoted to it, near its upper end, a reel-bearer, S, the rear end of which passes through a loop, $r$, on the upper end of the post R', said loop being provided with a series of perforations and a pin or bolt, permitting the adjustment of the said bearer S.

The forward end of the bearer S has a sleeve-bearing, $s$, secured to it, in which the shaft of the reel T is mounted.

The reel is of that construction usually termed an "overhung reel," its manner of application varying from the ordinary overhung reel in that, in the present instance, it is supported at and overhung from the grain side of the platform, and the means for driving the same are arranged entirely at said side and out of the way of the binders located at the opposite end of said platform, as follows, viz: $t$ is a pulley on the outer end of the reel-shaft, to which motion is communicated through a belt, $t'$, from a pulley, $u$, on a shaft, $v$, which forms the pivotal support for the bearer S, and upon this same shaft $v$ is mounted a second pulley, $u'$, to which motion is imparted by a belt from a pulley on the hub of the grain-wheel W.

By this arrangement the supports for the reel and the mechanism for driving it are taken out of the way of the binders, while the tension of the driving-belts remains unaffected by the adjustment of the reel.

Any suitable or convenient arrangement of belts or gearing may be employed for actuating the aprons and elevator-cylinder, and the cutting apparatus with its actuating mechanism, together with other parts of the machine not particularly referred to, may be of any usual or preferred construction and arrangement.

Having now described my invention, what I claim as new, and desire to secure by Letters Patent, is—

1. The binders' platform F, and binders' tables G arranged upon the grain side of the drive-wheel elevator and grain-receptacle, in combination with the driver's-seat support located inside the vertical face of the drive-wheel, substantially as and for the purpose described.

2. The platform apron or carrier, and the apron L arranged in the described relation to each other and to the binders' stand F, and operating to deliver the grain between the elevator slats, as set forth.

3. The overhung reel T, supported at the outer or grain side of the platform, in combination with the actuating-belts and pulleys arranged at the same side and operated from the grain-wheel, whereby said supports and driving mechanism are removed out of the way of the binders located at grain side of the elevator and drive-wheel, as described.

JAMES O. BROWN.

Witnesses:
I. H. BROWN,
S. A. CONRAD.